(12) United States Patent
Kado et al.

(10) Patent No.: US 8,857,179 B2
(45) Date of Patent: Oct. 14, 2014

(54) SECONDARY AIR SYSTEM WITH VARIABLE SPEED AIR PUMP AND MULTI-POSITION GATED CHECK VALVE

(75) Inventors: Mark S. Kado, Grosse Pointe, MI (US); Kenneth P. Degroot, Macomb Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 680 days.

(21) Appl. No.: 13/069,621

(22) Filed: Mar. 23, 2011

(65) Prior Publication Data

US 2012/0240908 A1 Sep. 27, 2012

(51) Int. Cl.
| | |
|---|---|
| F01N 3/22 | (2006.01) |
| F01N 3/34 | (2006.01) |
| F01N 3/30 | (2006.01) |
| F16K 11/052 | (2006.01) |
| F16K 11/074 | (2006.01) |
| F02B 33/44 | (2006.01) |
| F16K 31/04 | (2006.01) |
| F04B 49/03 | (2006.01) |

(52) U.S. Cl.
CPC ............ *F04B 49/03* (2013.01); *F02B 33/44* (2013.01); *F01N 3/225* (2013.01); *F16K 11/0525* (2013.01); *F16K 31/041* (2013.01)
USPC ............. 60/605.1; 60/290; 60/293; 60/304; 60/305; 60/289; 137/625.44; 137/625.46; 137/875; 137/876

(58) Field of Classification Search
USPC .......................................... 60/304
See application file for complete search history.

(56) References Cited

U.S. PATENT DOCUMENTS

| | | | | |
|---|---|---|---|---|
| 2,312,941 | A | * | 3/1943 | Tucker .................... 137/625.11 |
| 3,653,212 | A | * | 4/1972 | Gast et al. ..................... 60/293 |
| 3,721,265 | A | * | 3/1973 | Hoffland .................. 137/625.47 |
| 3,757,521 | A | * | 9/1973 | Tourtellotte et al. ............ 60/274 |
| 3,942,321 | A | * | 3/1976 | Eckhardt et al. ................ 60/289 |
| 4,191,014 | A | * | 3/1980 | Jones .............................. 60/290 |
| 4,245,466 | A | * | 1/1981 | Mendenhall .................... 60/289 |
| 4,345,228 | A | * | 8/1982 | Idogaki et al. ................ 335/222 |
| 4,635,674 | A | * | 1/1987 | Bajka ........................ 137/246.22 |
| 5,435,129 | A | * | 7/1995 | Hosoya et al. ................. 60/284 |
| 5,613,479 | A | * | 3/1997 | Gates et al. ............. 123/568.27 |

(Continued)

FOREIGN PATENT DOCUMENTS

JP 2003343246 A * 12/2003 ............... F01N 3/22

OTHER PUBLICATIONS

English Translation of JP 2003343246 A.*

*Primary Examiner* — Thomas Denion
*Assistant Examiner* — Jessica Kebea
(74) *Attorney, Agent, or Firm* — Ralph E Smith

(57) ABSTRACT

A secondary air system comprising a variable speed air pump and a gated check valve connected between the variable speed air pump and an IC engine. The gated check valve has two ports, and generally, a first of the two ports is connected to a first bank of engine cylinders, and a second of the two ports is connected to a second bank of engine cylinders. The system further comprises a controller for controlling the speed of the variable speed air pump, and the positioning of the gated check valve. The gated check valve is operable to fully close air flow to both ports, fully open air flow to one of the two ports, or variably split air flow between the two ports.

6 Claims, 8 Drawing Sheets

(56) References Cited

U.S. PATENT DOCUMENTS

| | | | | |
|---|---|---|---|---|
| 6,023,929 | A * | 2/2000 | Ma | 60/295 |
| 6,374,610 | B2 * | 4/2002 | Muckelmann et al. | 60/605.1 |
| 7,222,483 | B2 * | 5/2007 | Oi et al. | 60/289 |
| 7,617,678 | B2 * | 11/2009 | Joergl et al. | 60/605.2 |
| 8,127,796 | B2 * | 3/2012 | Bonanno | 137/876 |
| 2001/0047834 | A1 * | 12/2001 | Menin et al. | 137/875 |
| 2004/0255575 | A1 * | 12/2004 | Tachibana et al. | 60/277 |
| 2005/0011185 | A1 * | 1/2005 | Annoura et al. | 60/289 |
| 2005/0019168 | A1 * | 1/2005 | Huang et al. | 417/44.1 |
| 2005/0120711 | A1 * | 6/2005 | Koyama et al. | 60/289 |
| 2005/0244285 | A1 * | 11/2005 | Koyama | 417/410.1 |
| 2006/0025919 | A1 * | 2/2006 | Sealy et al. | 701/108 |
| 2006/0201468 | A1 * | 9/2006 | Lancaster et al. | 123/179.5 |
| 2007/0017213 | A1 * | 1/2007 | Katou | 60/285 |
| 2007/0039312 | A1 * | 2/2007 | Kondo | 60/277 |
| 2008/0016954 | A1 * | 1/2008 | Heinrich et al. | 73/116 |
| 2009/0148379 | A1 * | 6/2009 | Love et al. | 423/584 |
| 2010/0222981 | A1 * | 9/2010 | Hacker | 701/102 |
| 2012/0042630 | A1 * | 2/2012 | Pekrul et al. | 60/273 |
| 2012/0303241 | A1 * | 11/2012 | Akisada et al. | 701/102 |

\* cited by examiner

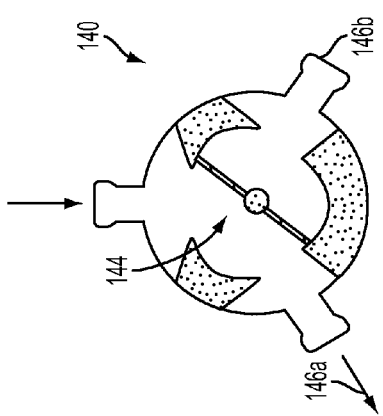
FIG. 5B PORT 1 OPEN PORT 2 CLOSED
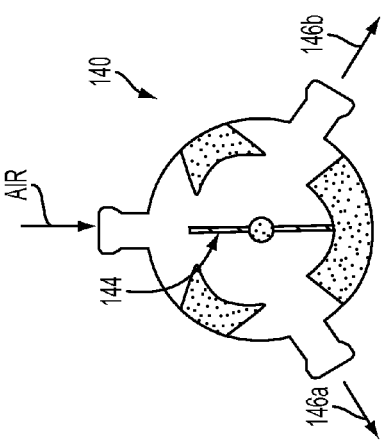
FIG. 5A 50/50 SPLIT
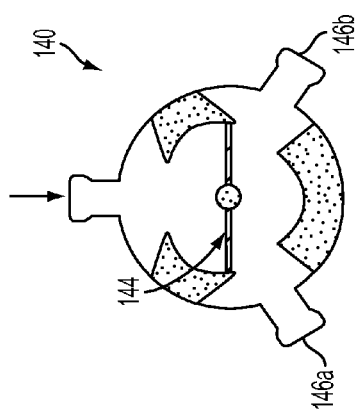
FIG. 5C PORT 2 OPEN PORT 1 CLOSED
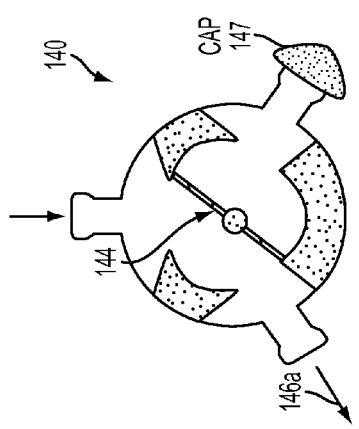
FIG. 5E FULLY CLOSED
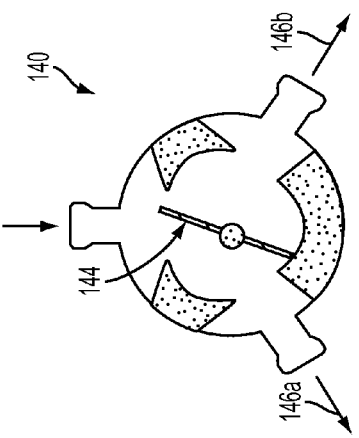
FIG. 5D 60/40 MIX OR VARIABLE
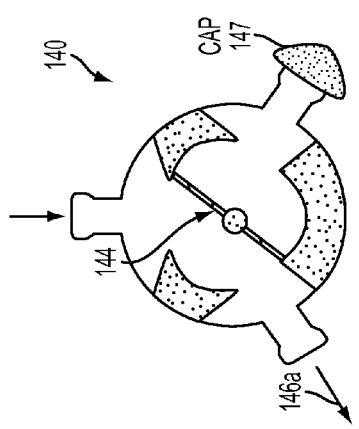
FIG. 5F SINGLE BANK

SECONDARY AIR SYSTEM WITH VARIABLE SPEED AIR PUMP AND MULTI-POSITION GATED CHECK VALVE

FIELD

The present disclosure relates to secondary air systems used in partial zero emissions vehicles (PZEVs)

BACKGROUND

Secondary air systems are common in many vehicles and are used to add oxygen to exhaust gases, aiding in final burn off of any undesirable emissions. Generally, secondary air systems operate by pumping fresh air into the exhaust by a simple electrical/mechanical air pump or a special one-way reed valve that utilizes the pulsing of the exhaust from the piston firings to draw the fresh air in. The secondary air, now mixed with exhaust, is injected into the exhaust manifolds, catalytic converters, or both.

In smaller engines, the secondary air system is generally used only at startup to help burn the rich air-to-fuel mixture needed to run a cold engine. Once the catalytic converter is at operational temperature, the secondary air system is shut down as it is no longer needed.

SUMMARY

In one form, the present disclosure provides a secondary air system for an internal combustion engine comprising a variable speed air pump and a gated check valve connected between the variable speed air pump and the IC engine. The gated check valve generally has two ports. A first of the two ports is generally connected to a first bank of engine cylinders, and a second of the two ports is generally connected to a second bank of engine cylinders. However, one of the two ports can be capped, and the system used to drive a single bank of engine cylinders as well. The gated check valve is operable to fully close air flow to both ports or fully open air flow to one of the two ports, or variably split air flow between the two ports.

The secondary air system also generally comprises a controller for controlling the speed of the variable speed air pump, and the positioning of the gated check valve, and at least one delta pressure feedback sensor positioned between a junction point where the variable speed air pump and gated check valve are connected, and one of the output ports of the gated check valve. The speed of the variable speed air pump is determined by comparing a measured air pressure from the delta pressure feedback sensor and comparing the measured air pressure to a desired air pressure, and can be adjusted based on the determination.

The present disclosure also provides an air pump for a secondary air system comprising a fan motor contained within housing and being operable to be driven by a controller at a variable speed to draw air in from an input port and direct it towards an output port. The speed of the fan motor is adjustable.

The present disclosure further provides a multi-position gated check valve for a secondary air system, the check valve comprising a housing having an input port and two output ports, and a plug mounted on a motor within the housing, the plug being operable by a controller to direct air flow from the input port to the output ports. The plug is operable to be positioned to fully close air flow to both output ports or fully open air flow to one of the two output ports, or to variably split air flow between the two ports. The check valve can also include at least one delta pressure feedback sensor positioned between the input port and one of the output ports.

Further areas of applicability of the present disclosure will become apparent from the detailed description, claims and drawings provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

BRIEF DESCRIPTION OF THE DRAWINGS

FIGS. 5A-5F are schematics showing operation of the gated check valve of FIG. 4;

DETAILED DESCRIPTION

In one form, the present disclosure provides a secondary air system combining a variable speed air pump and multi-positioned gated check valve. The gated check valve can have delta pressure feedback sensors at its input and output ports. The air pump is controlled using a pulse-width-modulated (PWM) signal. As air is drawn in by the variable speed air pump, it is directed to the desired engine bank by the gated check valve. In a dual bank engine, the check valve can be fully closed, open to only bank 1, open to only bank 2, or variably split. In a single bank engine, the check valve can be fully closed or open, but also partially open.

This system allows for maximum control and can improve OBD (On-Board Diagnostics) and end of line diagnostics, and permits the removal of mass air flow (MAF) sensors found in conventional secondary air systems since air flow can be determined via the delta pressure sensors. It also eliminates the need for multiple check valves, as well as several hose and joint connections, which are common sources of air leakage.

The variable speed air pump disclosed herein can be used in conventional secondary air systems, i.e., those that use pressure operated; vacuum actuated, or electrically controlled check valves. For instance, end of line diagnostics must check the integrity of the entire secondary air system. Having the ability to vary the airflow and head pressure, an end of line diagnostic can better control a pressure operated check valve. At lower controlled air flow, the check valve would remain closed, thus allowing hoses and junctions in front of the check valve to be checked. At higher speeds, the pressure controlled check valve will open and allow air to flow. The variability of airflow allows vehicles to achieve desirable emissions and testing requirements.

Figure 7A:
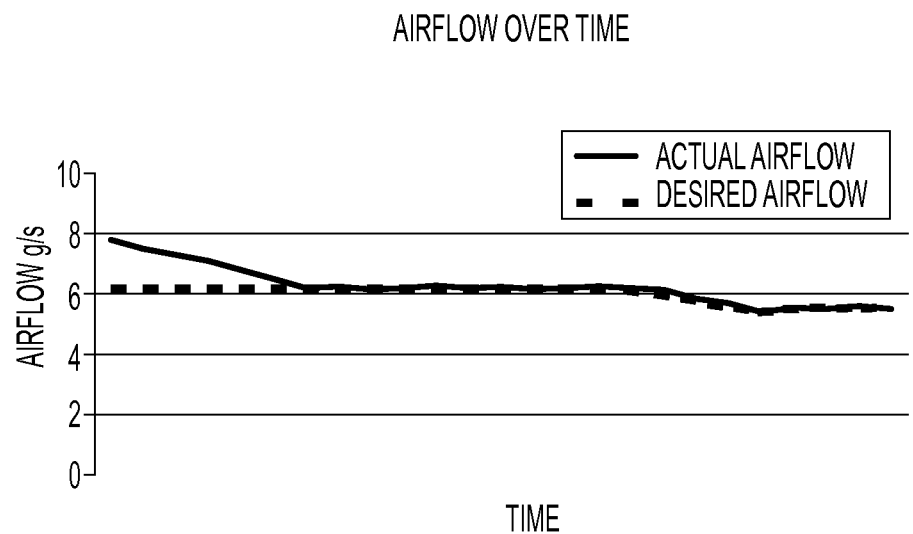
FIGS. 7A and 7B are graphs showing closed loop calibration of a secondary air system with variable speed air pump.
Figure 7B:
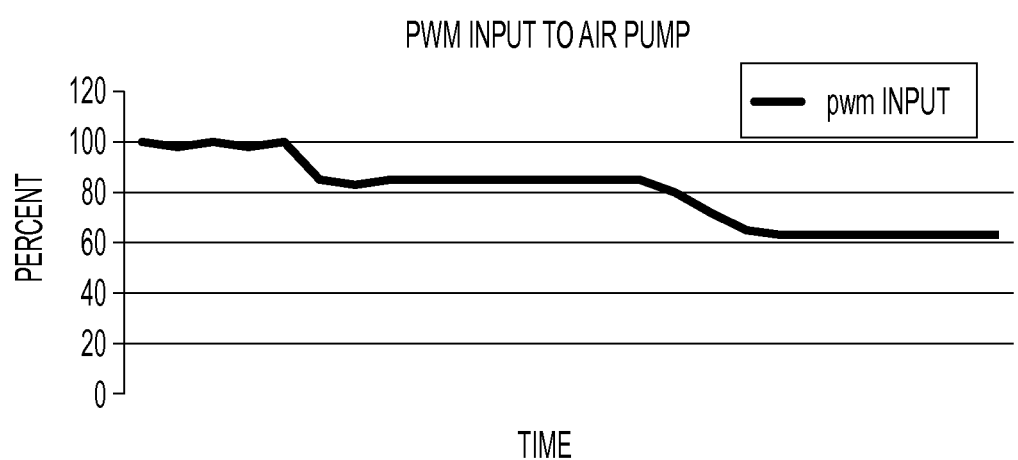
Figure 8A:
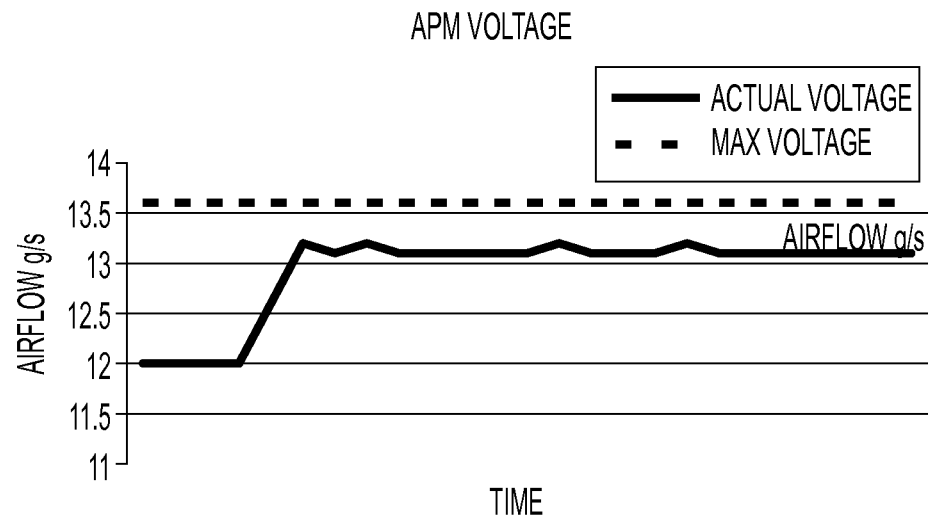
FIGS. 8A and 8B are graphs showing calibration of an input voltage to a variable speed air pump operating on an accessory power module voltage.
Figure 8B:
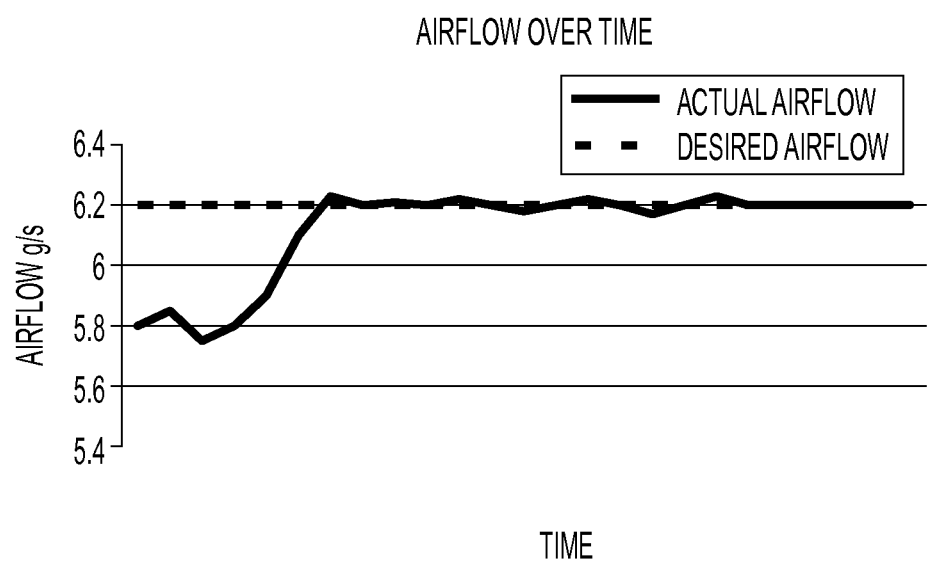

Because the air pump is electronically controlled, it can be tuned for specific engine applications and different ambient conditions. It can also be adjusted as the air pump degrades, i.e., over the vehicle life cycle. A calibrator can target a specific or programmable amount of air to optimize an oxidation reaction. As a result, because the air is held constant, the fuel is also held constant, resulting in more consistent air injection and fuel control and a more stable cold start calibration catalyst light off technique. The vehicle can also perform this function automatically by measuring actual air flow against desired air flow using MAF or delta pressure feedback sensors, and adjusting an input voltage appropriately. The input voltage can be a PWM signal input from a controller, or, as an illustrative example, the accessory power module voltage in a hybrid vehicle. Closed-loop feedback is provided by the air flow level, because air flow will increase or decrease with voltage adjustment, whether by change in pulse width (FIGS. 7A-7B) or increasing/decreasing the voltage directly (FIGS. 8A-8B). This removes variability from air pump to air pump, since all pumps can be so calibrated.

Additionally, like the variable speed air pump, the gated check valve disclosed herein can be used in conventional secondary air systems, i.e., those that use simple air pumps. In a dual bank engine, the gated check valve permits maximum flow control capability and the ability to account for imbalances in air flow from bank to bank. In addition, only one check valve is needed, as opposed to two in other systems. As noted above, the gated check valve can also have delta pressure feedback sensors, which allows for the removal of MAF sensors.

Figure 1:
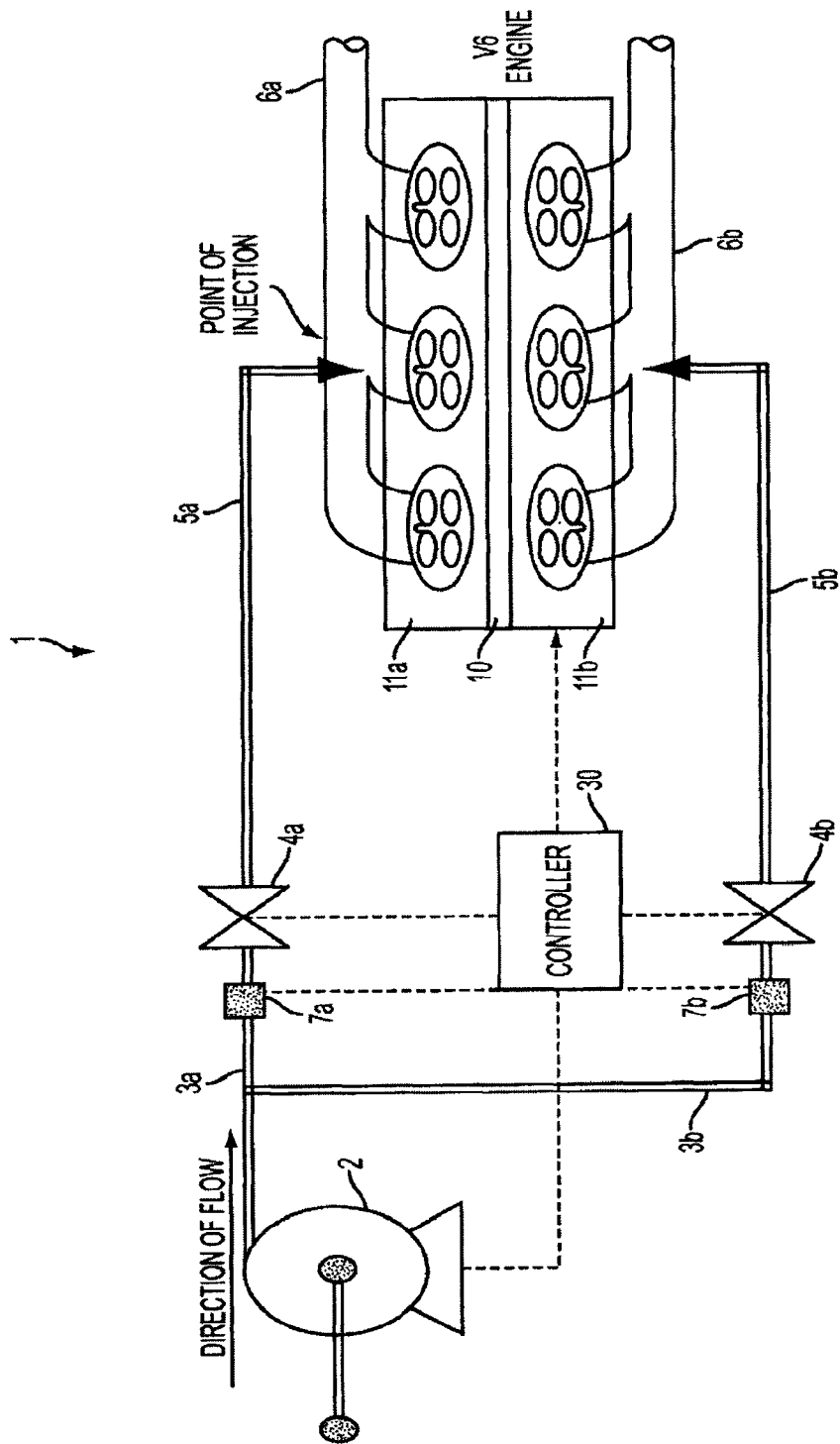
FIG. 1 is a schematic of a conventional secondary air system.

A conventional secondary air system 1 for a dual cylinder bank, V-6 internal combustion engine 10 is shown in FIG. 1. System 1 comprises an air pump 2 connected, via respective hoses 3a and 3b, to a pair of check valves 4a and 4b. The check valves 4a, 4b can be, e.g., pressure operated, vacuum actuated (in such case, a vacuum solenoid, not pictured, is included), or electrically controlled. A second set of hoses 5a and 5b connect airflow to points of injection 6a and 6b for each bank 11a, 11b. Mass air flow (MAF) sensors 7a and 7b are respectively connected to hoses 3a and 3b. Such conventional secondary air systems 1 are quite simple. Controller 30 is operable to turn air pump 2 either on or off, and open or close check valves 4a and 4b (if vacuum actuated, by activating the vacuum solenoid). As a result, there is no ability to tune such a conventional system 1.

Figure 2:
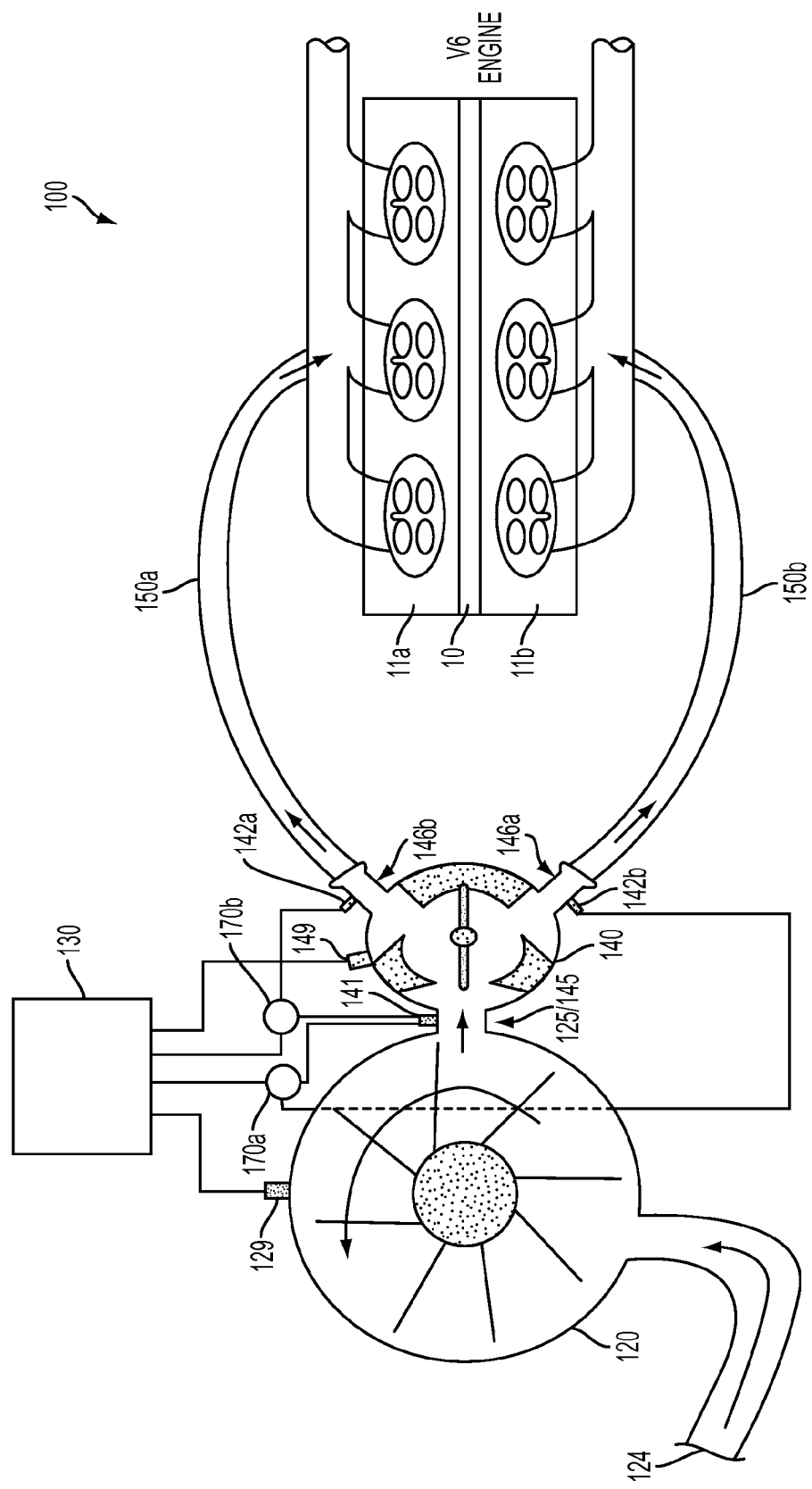
FIG. 2 is a schematic of a secondary air system with variable speed air pump and gated check valve, in accordance with a disclosed embodiment.

FIG. 2 illustrates an exemplary secondary air system 100 having a variable speed air pump 120 and two-port multi-position gated check valve 140, each operated by controller 130. The variable speed air pump 120 and gated check valve 140 are coupled with an output port 125 of the variable speed air pump/input port 145 of the gated check valve. As shown in FIG. 2, the check valve 140 is coupled with an output port 125, but it is understood that an intermediate member could be connected between them, so long as there is fluid communication between them. The gated check valve 140 directs air pumped in by the variable speed air pump 120 to either, both or none of cylinder banks 11a and 11b of engine 10, via hoses 150a, 150b.

Optional delta-pressure feedback sensors 170a and 170b can be connected to the secondary air system 100 to measure pressure differentials between a point 141 at the junction of the output port 125 of the variable speed air pump/input port 145 of the gated check valve, and points 142a, 142b at output ports 146a, 146b of the gated check valve 140. The speed of the variable speed air pump can be determined by comparing a measured air pressure from the delta pressure feedback sensor and comparing the measured air pressure to a desired air pressure. With a result, controller 130 can adjust the speed of the pump, either by changing a duty cycle (pulse width) of a PWM control signal, or increasing or decreasing a drive voltage.

Figure 3:
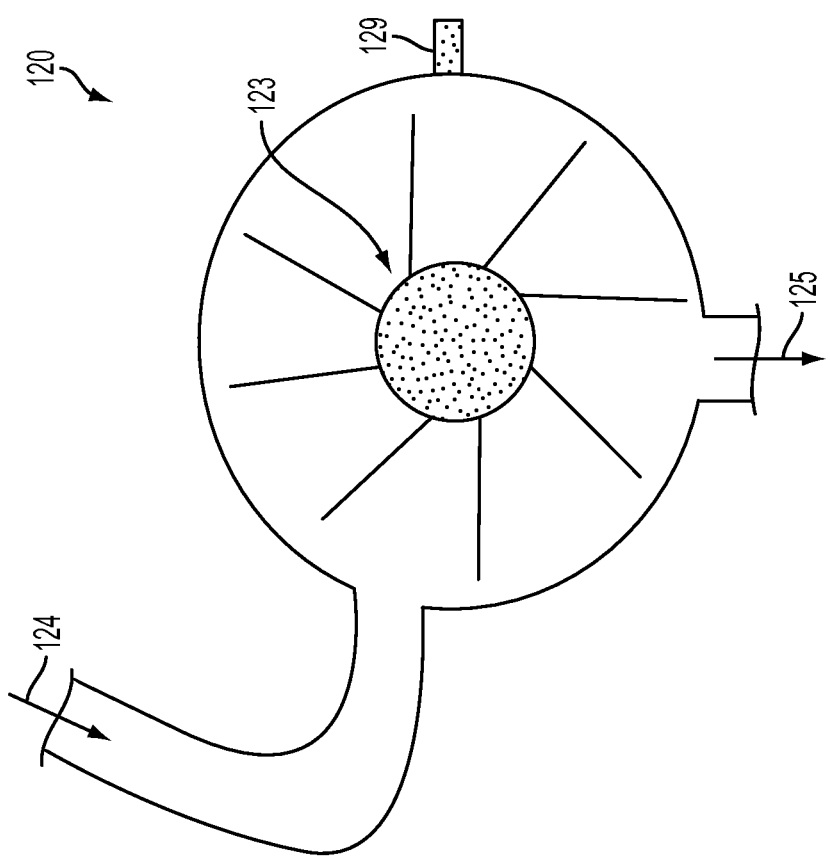
FIG. 3 is a schematic of a variable speed air pump.
Figure 4:
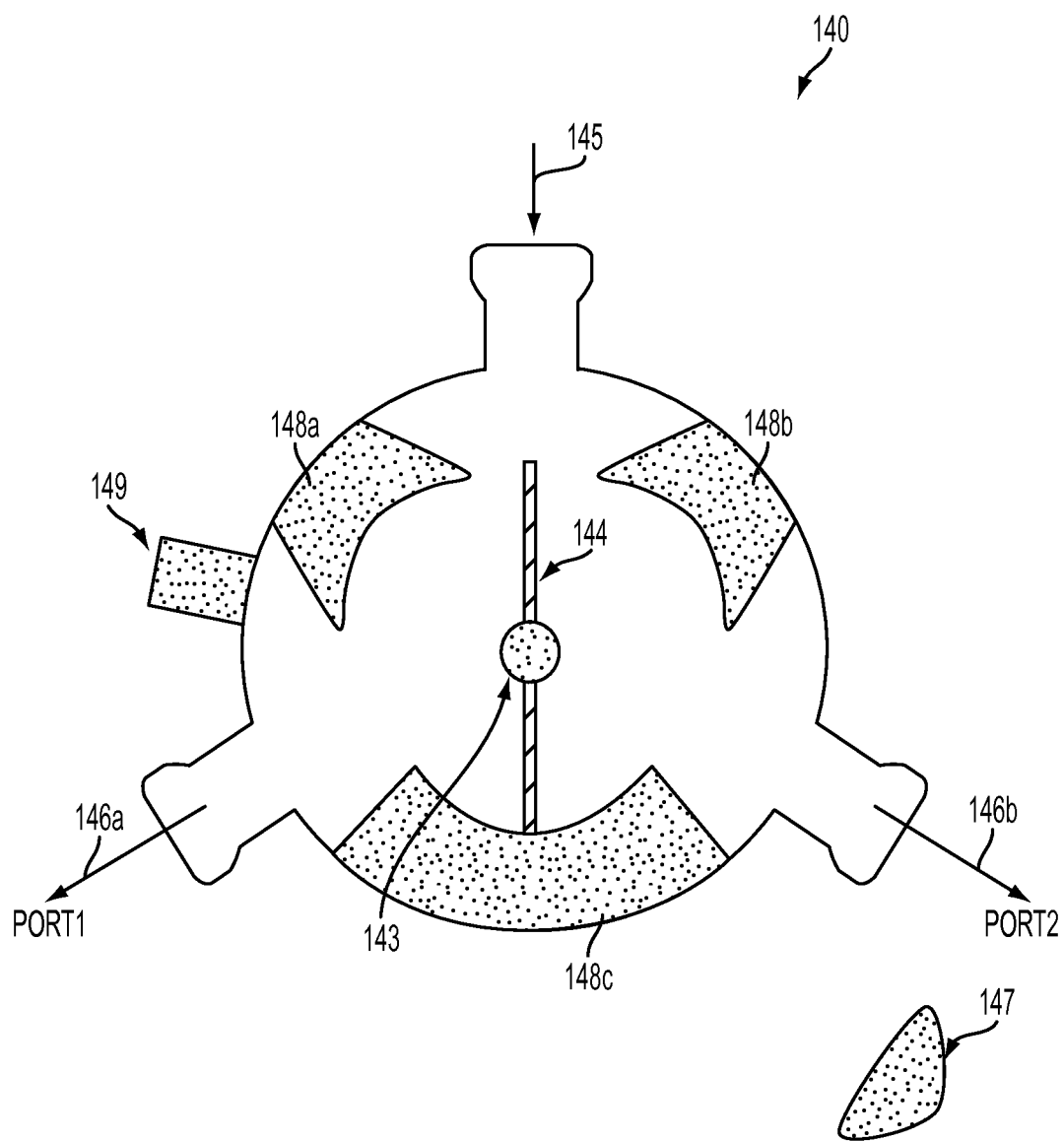
FIG. 4 is a schematic of a gated check valve.

FIG. 3 shows variable speed air pump 120 in more detail. Variable speed air pump 120 comprises a housing having a controllable motorized fan 123 within the pump 120, an input port 124 and an output port 125. Electrical connector 129 permits air pump 120 to be controlled by controller 130. Electrical connector 129 may deliver both electrical power and ground, as well as duty cycle or control information. The fan 123 is preferably pulse-width modulation (PWM) controlled, so that the duty cycle of an input signal can control the absolute speed of the fan, e.g., from 0% to 100%. However, it should be appreciated that the fan 123 can be directly voltage controlled, e.g., via the accessory power module voltage as on a hybrid electric vehicle FIG. 4 shows a two-port multi-position gated check valve 140 in more detail. The check valve 140 comprises a series of spaced apart valve walls 148a, 148b and 148c mounted within a housing 140 which permit direction of airflow out of the valve ports. Two-port multi-position gated check valve 140 comprises a plug 144 mounted on a motor 143, preferably a stepper motor, contained within a housing of the valve 140, rotatably configured to direct or block airflow between one or more of the valve walls 148a, 148b and 148c. The plug 144 is, for example, rubberized to ensure a tight seal when in a desired position against valve walls 148a, 148b and 148c. Electrical connector 149 permits valve 140 to be controlled by controller 130. Electrical connector 149 may deliver both electrical power and ground, as well as control information. Although the gated check valve 140 is optimally used with dual bank engines, i.e., engine 10 in FIG. 2, it can also operate on single bank engines. In such case, a cap 147 is fitted to one of output ports 146a, 146b.

FIGS. 5A-5F show various operational modes of gated check valve 140. FIG. 5A shows plug 144 aligned to permit 50/50 airflow to both output ports 146a, 146b. FIG. 5B shows plug 144 aligned to fully open port 146a, but close port 146b. FIG. 5C shows the opposite, with port 146a being closed and port 146b being fully open. FIG. 5D shows plug 144 aligned to provide a variable split airflow (60/40 is shown, but it should be understand any split, e.g., 53/47, or 61/39, could be achieved) to ports 146a, 146b. FIG. 5E shows plug 144 in a fully closed position, i.e., one where no airflow exits ports 146a, 146b. FIG. 5F shows valve 140 in a single bank configuration using cap 147. It is understood that controller 130 is programmed to reconfigure valve 140 per FIGS. 5A-5F.

Figure 6:
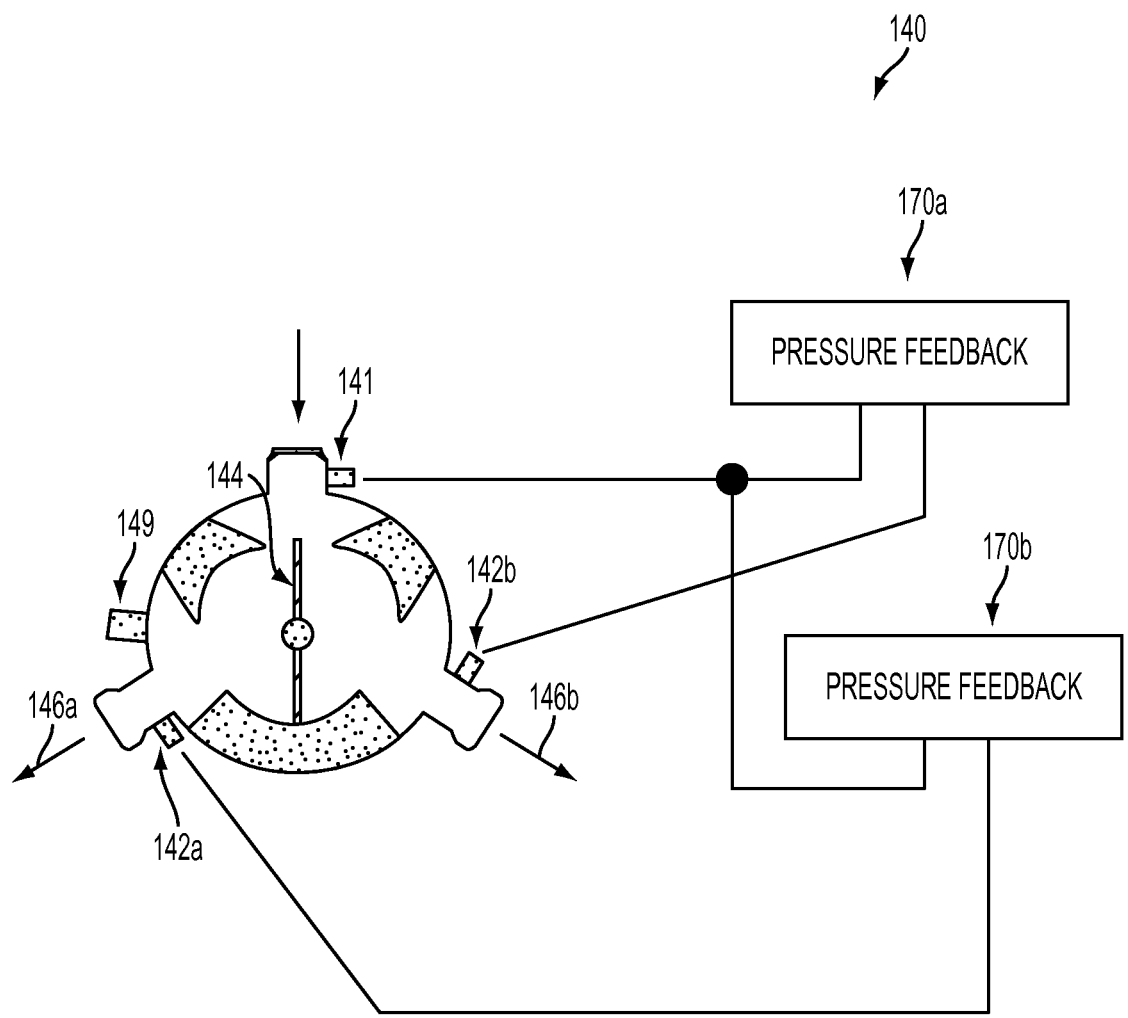
FIG. 6 is a schematic of a gated check valve with delta pressure feedback sensors.

FIG. 6 shows the optional delta-pressure feedback sensors 170a and 170b installed on two-port multi-position gated check valve 140. As shown, the sensors 170a, 170b can measure a pressure differential between the input port 145 and the output ports 146a, 146b of the gated check valve 140. The controller 130 can use this information to adjust the valve 140 if needed

What is claimed is:

1. A secondary air system of an internal combustion (IC) engine, the system comprising:
 a variable speed air pump configured to output air;
 a gated check valve coupled to the variable speed air pump and having a pair of output ports, the gated check valve configured to fully close air flow to both of the pair of output ports, to open air flow to one of the pair of output ports, and to open air flow to both of the output ports;
 a pair of hoses coupled to the pair of output ports, respectively, and further coupled to a pair of points of injection for a first exhaust manifold of a first bank of engine cylinders and a second exhaust manifold of a second bank of engine cylinders, respectively, of the IC engine;

at least one delta pressure feedback sensor configured to measure a pressure differential between a first point where the variable speed air pump and the gate check valve are connected, and a second point at one of the pair of output ports of the gated check valve; and a controller controlling the speed of the variable speed air pump, and a position of the gated check valve in response to the pressure differential measured by the at least one delta pressure feedback sensor.

2. The system of claim 1, wherein the speed of the variable speed air pump is determined by comparing a measured air pressure from the delta pressure feedback sensor and comparing the measured air pressure to a desired air pressure.

3. The system of claim 2, wherein the speed of the pump is adjusted based on the determination.

4. The system of claim 3, wherein the adjustment comprises increasing or decreasing a drive voltage level to the variable air speed pump.

5. The system of claim 3, wherein the adjustment comprises increasing or decreasing a pulse width of an input signal to the variable air speed pump.

6. The system of claim 1, wherein the gated check valve is further operable to variably split air flow between the pair of output ports.

* * * * *